Oct. 4, 1927. 1,644,158
C. F. STRONG
SYSTEM FOR GENERATING AND DISTRIBUTING ELECTRICITY
Original Filed June 25, 1919
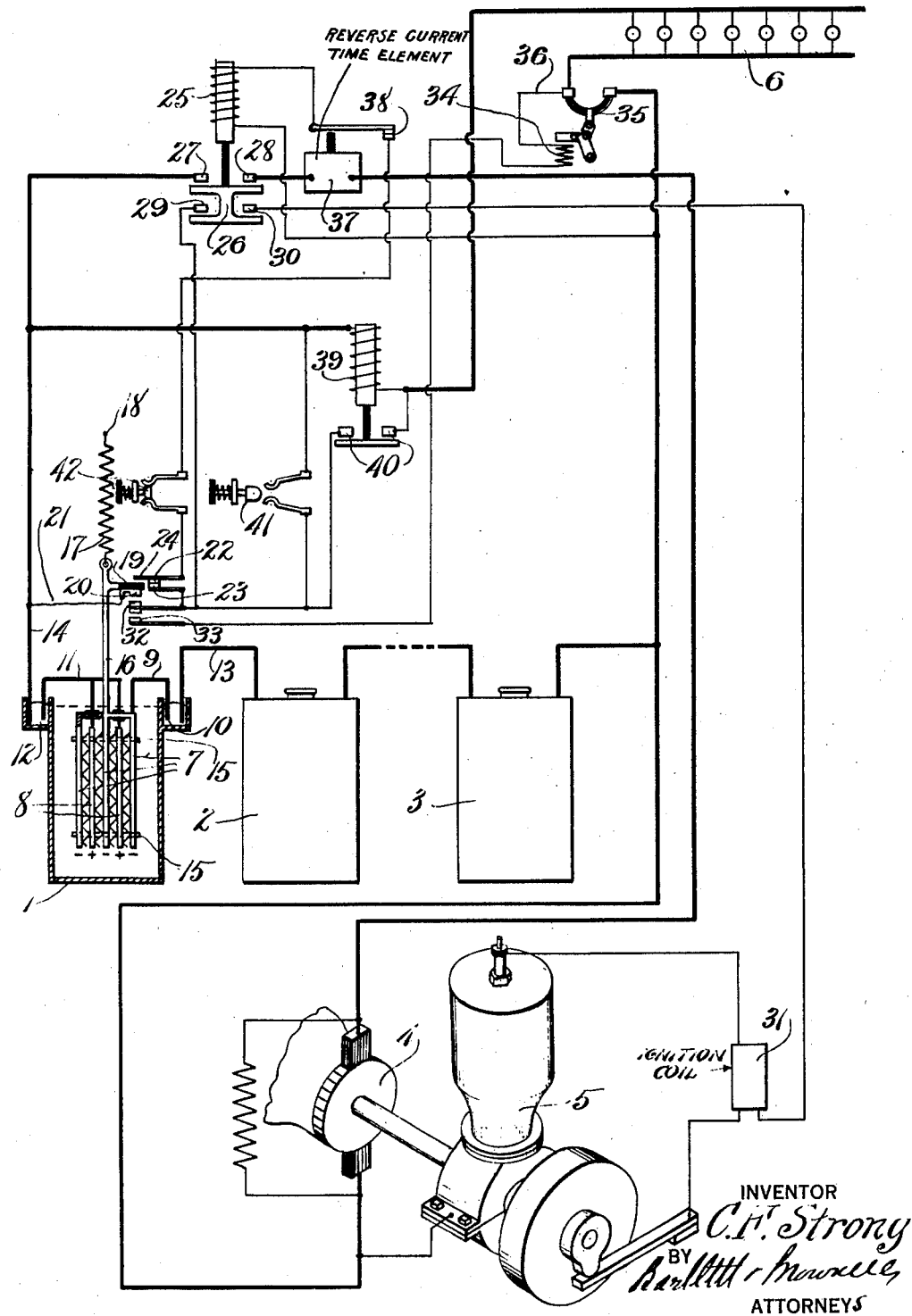

Patented Oct. 4, 1927.

1,644,158

UNITED STATES PATENT OFFICE.

CHESTER F. STRONG, OF NEW YORK, N. Y.

SYSTEM FOR GENERATING AND DISTRIBUTING ELECTRICITY.

Application filed June 25, 1919, Serial No. 306,601. Renewed March 5, 1927.

My invention relates to an improved system for generating and distributing electricity, and has for its object to provide a system having a generator operated by an internal combustion engine and storage battery, both are adapted to supply current to the translating devices, and in which current from the battery may be used to start the engine in a new and improved manner. Another object is to provide new and improved means for automatically recharging the battery. Another object is to provide means for protecting the battery against too great a degree of discharge.

One of the features of my invention consists in using a storage battery cell to control an electric circuit through variations in weight of an electrode which occur as the condition of the battery varies. Another feature consists in securing all the electrodes of the cell together and utilizing the variations in weight of the structure so formed. Another feature consists in providing means for stopping the charging of the cell when fully charged. Another feature consists in providing means for protecting the cell against too great a degree of discharge in case the automatic recharging means fails to operate. Another feature consists in causing a cell to protect itself and other cells from too great a degree of charge or discharge.

The accompanying drawing shows an embodiment of my invention, reference being had to the accompanying drawing which shows diagrammatically a system embodying my invention.

Referring to the drawing, 1, 2 and 3 are a series of secondary batteries of a type in which the positive and negative elements increase in weight as the batteries discharge. I preferably use the lead type of cell. 4 is a direct current generator operated by an internal combustion engine 5 and 6 is a load-circuit. The load-circuit is adapted to be supplied by the generator 4 directly or by the batteries 1, 2 and 3, or by both simultaneously and the batteries are adapted to be charged by the generator 4, when necessary. Means are provided for automatically connecting the generator to the battery to start the engine when the battery is discharged to a certain point and to stop the engine and disconnect it from the battery when the battery is charged to a certain point. Means are also provided for bringing the engine into operation to assist the battery in supplying the load when the load suddenly rises beyond a determined point. Means are also provided for disconnecting the load and the engine from the battery in case the engine for some reason fails to start when it ought to start.

The battery 1 and the circuit-controlling device actuated thereby constitute my improved means for controlling electric circuits. This battery 1 is provided with two sets of plates, 7 being the negative plates constituting one element which are electrically connected together and 8 being the positive plates which are also electrically connected together but insulated from the negative plates constituting the other element. The negative plates are connected to terminal 9 which dips into a mercury cup 10, while the positive plates are connected to a terminal 11 which dips into mercury cup 12. From these mercury cups lead conductors 13 and 14 connecting the cell 1 in circuit with the other cells 2, 3, etc. and the load 6. The positive and negative plates 7 and 8 are rigidly connected together by insulating rods 15 so as to constitute a rigid structure. This rigid structure is supported by a rod 16, which in turn is supported by a spring 17 whose upper end is secured to a fixed abutment 18. Connected to the rod 16 is an insulated arm 19 constituting a contact actuator and carrying a contact 20, which, in the embodiment shown, is electrically connected by a flexible conductor 21 to the main 14. This arm 19 is utilized to control one or more circuits by opening and closing contacts therein. Thus, for instance, it may control a circuit containing the separable contacts 22 and 23 by lifting the contact 22 so as to separate it from the contact 23 through engagement and the extension 24 from the contact 22. It may also control other circuits, as hereinafter described.

The cell with the contacts above described is one form of circuit controller suitable for use in my invention and operates as follows: The cell is connected in a circuit so that, according to varying conditions, it is alternately charged and discharged. As it discharges the plates 7 and 8 increase in weight so that they produce an extension of the spring 17 carrying the arm 19 downward. Conversely, when the cell is being charged, the plates 7 and 8 decrease in weight so that the spring 17 lifts the plate together with the arm 19. When the arm 19 is lifted, it engages with the projection 24 and separates the contact 22 from the contact 23. When the battery is discharging and the plates are thereby increased in weight, the resulting downward movement of the arm 19 permits the contact 22 to re-engage the contact 23 and re-establish the circuit therethrough or causes the contact 20 to make engagement with a co-operating contact 32 to close another circuit, if desired. The circuit controller, therefore, utilizes the variation in weight of the battery plates for circuit-controlling purposes being responsive to changes in the condition of charge and not to any particular voltage of said cell or the storage battery of which it forms a part. The mercury cups 10 and 12, together with the plate terminals dipping therein is one of various constructions that may be used to permit the easy movement of the movable portion without disturbing its circuit connections.

In the system shown, the contacts 22 and 23 are in series with a solenoid 25, which controls a switch arm 26, which, when the solenoid 25 is energized, connects the contacts 27 and 28 to one another and also the contacts 29 and 30 to one another. It also connects the contacts 29 and 30 with the contact 27. When the contacts 22 and 23 are separated by the arm 19 the circuit through the solenoid 25 is interrupted so that the switch arm 26 falls open separating the contacts 27 and 28 which are in series with the generator 4 and separating the contacts 29 and 30, which are in series with the ignition coil 31 of the internal combustion engine so that the generator 4 is disconnected from the batteries 1, 2 and 3 and the ignition is cut off so that the engine stops. While I have shown means for stopping the engine by acting upon the ignition coil, the contact 30 may be used actuating other known means for stopping the engine, such, for instance, as means for stopping the engine, by controlling the fuel supply. The contact 20 is adapted to engage a contact 32 and is so engaged when the battery is discharged to a predetermined point. When it is so engaged it is connected with the main 14 through the conductor 21 and, being in series with the solenoid 25, energizes the same so as to lift the switch arm 26 and cause it to close the contacts associated therewith. This supplies battery current to the armature of the generator 24, causing it to act as a motor to start the internal combustion engine, whose ignition coil has also been by this means connected in circuit. After the switch arm 26 is closed the solenoid 25 remains energized even though the contact 20 may be separated from contact 32 on account of the electrical connection established between the contacts 27 and 29, which establishes a circuit in multiple with the connection 21 and in series with the solenoid 25.

If for any reason the internal combustion engine 5 fails to start and the batteries 1, 2 and 3, being connected to the load 6 are in danger of being too greatly discharged, the further downward movement of the arm 19 causes it to bring the contact 32 into engagement with the contact 33, which is in series with an actuating solenoid 34 of a circuit-breaker 35, thus forming a connection including the conductor 21 and the conductor 36 across the mains supplying the load 6. This causes the circuit-breaker 35 to open so as to disconnect the load from the battery-circuit.

In order to protect the system against the failure of the engine to start, I provide a reverse current circuit-opener having a time element represented at 37, of which there are a number upon the market. This reverse current circuit-opener has separable contacts 38 which are automatically opened when the reverse current has continued to flow for a predetermined period, say for five minutes, but will not open when the current is going in such direction that it would charge the battery. By using this reverse current circuit-opener I am enabled to cut out the generator automatically in case the battery current fails to start the engine during the interval for which the reverse current element is set. If the engine does not start during this interval the contacts 38 are automatically opened, thereby de-energizing the coil 25 and disconnecting the generator 4 from the battery and interrupting the ignition circuit of the engine until the reverse current element is manually reset.

If at any time an excessive load is put upon the battery, while the engine 5 is out of action, it energizes the solenoid 39, which closes contacts 40, which are in series with the solenoid 25 and, when closed, connected across the mains with the result that the generator is thrown into circuit with the battery so that the engine is started thereby and brought into action to assist the battery in supplying the excessive load, subject, however, to the control of the reverse current device 37 which, after it operates, has to be restored manually to its original position.

The connection of the contacts 27 and 29 by the switch arm 26 forms a shunt circuit around the contacts 20 and 32 and also around the contacts 40 and the switch 41 so that after the switch arm 26 is once closed, it remains closed irrespective of the relations of those contacts and switch until that shunt circuit is broken. This occurs when the contacts 23 and 24 are separated by the arm 19 upon the completion of the charging of the battery or can be accomplished manually by the manual switch 42. Upon the breaking of this shunt circuit the switch arm 26 opens and the generator is disconnected from the battery and the load, and the engine is stopped by the interruption of one of its operative elements such as its ignition circuit.

The engine can be started through the generator manually by actuating the push button 41, if desired, which throws the solenoid 25 across the mains. The engine can also be stopped manually by actuating the push button 42, which interrupts the circuit through the solenoid 25.

The particular circuit controlling device described and shown herein is not necessarily used in embodying my present invention, but forms the subject matter of a divisional application, Serial No. 420,180, filed by me on October 28, 1920.

As will be evident to those skilled in the art, my invention permits of various modifications without departing from the spirit thereof or the scope of the appended claims.

What I claim is:

1. In a system for generating and distributing electricity, a load circuit, a series of cells constituting a storage battery normally connected to said circuit, a generator for charging the same, an internal combustion engine for actuating said generator, a solenoid switch for connecting said generator and battery to cause said battery to start the engine, normally open contacts controlling said solenoid switch, means actuated by a single cell for closing said contacts when said cell is discharged to a predetermined point, means for forming a shunt around said contacts when once closed so as to maintain said solenoid switch closed independently of the relations of said contacts, and normally closed contacts in circuit with said solenoid and adapted to be opened by said first mentioned means when said cell becomes charged to a predetermined point.

2. In a system for generating and distributing electricity, a load circuit, a series of cells constituting a storage battery normally connected to said circuit, a generator for charging the same, an internal combustion engine for actuating said generator, a solenoid switch for connecting said generator and battery to cause said battery to start the engine, normally open contacts controlling said solenoid switch, means actuated by a single cell for closing said contacts when said cell is discharged to a predetermined point, additional normally open contacts closed by said first mentioned means when said cell becomes discharged to a lower predetermined point, and an electromagnetic circuit breaker having its actuating coil in series with said additional contacts and adapted to disconnect the load circuit from the battery upon the closing of said additional contacts.

3. In a system for generating and distributing electricity, the combination of a storage battery, a generator for charging the same, an internal combustion engine for operating said generator, a load-circuit with which said battery and generator are adapted to be placed in multiple, a solenoid switch having normally open contacts in series with said battery and the generator, a second solenoid switch having its solenoid in series with the load, normally open contacts in series with the solenoid of said first switch and adapted to be closed by said second switch when sufficiently energized, means for maintaining the circuit through the solenoid of said first switch closed after it is once closed by the action of said second switch, and means for interrupting said first solenoid circuit, said interrupting means being controlled by the condition of charge of said battery so as to act when the battery has been charged to a predetermined point.

4. In a system for generating and distributing electricity, the combination of a series of cells constituting a storage battery, a generator for charging the same, an internal combustion engine for operating said generator, a load-circuit, means for connecting said battery and generator in multiple with said load-circuit, a solenoid switch having normally open contacts in series with said battery and the generator, a second solenoid switch having its solenoid in series with the load, normally open contacts in series with the solenoid of said first switch and adapted to be closed by said second switch when sufficiently energized, means for maintaining the energizing circuit through the solenoid of said first switch closed after it is once closed by the action of said second switch, and means for interrupting said energizing circuit, said last mentioned means consisting of normally closed contacts and a device for separating the same actuated by a single one of said cells when said cell is charged to a predetermined point.

5. In a system for generating and distributing electricity, the combination of a series of cells constituting a storage battery, a generator for charging the same, a load-circuit normally connected to said battery, a solenoid switch for connecting and disconnecting said generator with said load-circuit in multiple with said battery, a second solenoid switch having its solenoid in series with the load, a circuit connected to the solenoid of said first switch, normally open contacts therein closed by said second solenoid switch when sufficiently energized, a circuit having normally open contacts closed by said first solenoid when energized and completing a shunt around the contacts controlled by said second solenoid switch, and means for opening the circuit through said first solenoid.

6. In a system for generating and distributing electricity, the combination of a series of cells constituting a storage battery, a generator for charging the same, a load-circuit normally connected to said battery, a solenoid switch for connecting and disconnecting said generator with said load-circuit in multiple with said battery, a second solenoid switch having its solenoid in series with the load, a circuit connected to the solenoid of said first switch, normally open contacts therein closed by said second solenoid switch when sufficiently energized, a circuit having normally open contacts closed by said first solenoid when energized and completing a shunt around the contacts controlled by said second solenoid switch, and means for opening the circuit through said first solenoid, said means comprising a plurality of sets of separable contacts in series with one another.

7. In a system for generating and distributing electricity, the combination of a series of cells constituting a storage battery, a generator for charging the same, a load-circuit normally connected to said battery, a solenoid switch for connecting and disconnecting said generator with said load-circuit in multiple with said battery, a second solenoid switch having its solenoid in series with the load, a circuit connected to the solenoid of said first switch, normally open contacts therein closed by said second solenoid switch when sufficiently energized, a circuit having normally open contacts closed by said first solenoid when energized and completing a shunt around the contacts controlled by said second solenoid switch, means for opening the circuit through said first solenoid, said means comprising a plurality of sets of separable contacts in series with one another and a reversed current time element for separating the contacts of one of said sets.

CHESTER F. STRONG.